July 20, 1926.

F. C. JACKSON

GRADE METER

Filed June 27, 1923

1,593,262

Witness:
Stephen F. Nebora

Inventor:
Fred C. Jackson,
by Frank L. Belknap, Atty.

Patented July 20, 1926.

1,593,262

UNITED STATES PATENT OFFICE.

FRED C. JACKSON, OF YUBA CITY, CALIFORNIA.

GRADE METER.

Application filed June 27, 1923. Serial No. 647,988.

This invention relates to improvements in grade meters, and refers more particularly to a device for indicating automatically the gradient of a hill which a motor vehicle is climbing or descending.

Among the objects of the invention are to provide a simple type of construction which automatically indicates the steepness or gradient upon which a motor vehicle is traveling, whereby the driver may be at all times informed of the character of the road and may manipulate the machine accordingly; to provide a device which is particularly adapted to use at night to inform the driver of the steepness of the highway, and thereby reduce materially accidents caused by steep grades or sharp declivities; to provide a construction which is self-operating, cheap and rugged in construction, being self-contained, and relying upon no part of the vehicle mechanism for accurate indication.

Figure 1:
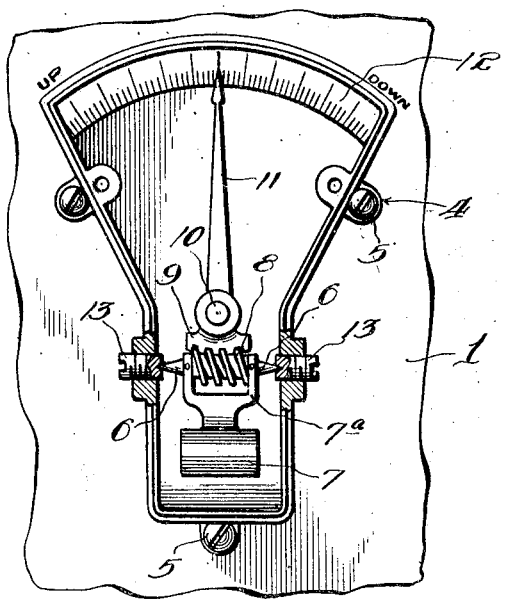
Fig. 1 is a face view of the device as mounted upon the dashboard of the vehicle in plain view of the driver.

Referring to the drawings, the device as shown in the figures is preferably mounted upon the dashboard 1 of the motor vehicle, or may be mounted upon any convenient position where it is conspicuous and can be watched by the driver.

The device comprises a casing which has a rear portion 2 and a front plate 3 fitted by tight connections or joints to the rear portion of the casing. Fastening lugs 4 forming a part of the upper and lower portions of the casing supply a means for fastening the device to the dash 1 by means of screws shown at 5. The grade meter may be inset so that a substantial portion of it is relatively flush with the dash, or positioned in a manner shown in the drawings. Within the casing is pivoted on two relatively non-frictional pivoted bearings 6 a weight member 7 which is hung from the bearing element by a yoke 7ª straddling the worm 8 which forms a part of the pivoted shaft. Meshing with the worm is a gear sector 9 which is pivoted at 10 to the rear portion of the casing, an indicating hand 11 being integral with the sector pivoted at 10 so that any rotation given the sector by the worm will be transmitted to the hand 11 and indicated upon the graduated arc 12 at the top of the casing and near the upper extremity of the hand. The graduation upon the arc may be arbitrarily chosen indicating either in percent gradient or the number of feet per mile rise. The tapered pivot bearings are supported by adjustable bearing plugs shown at 13 and may be rigidly set so that the worm and weight will have a relatively non-frictional bearing without excessive end play.

In mounting the device it is essential that the vehicle be placed on a level surface, and that the device be accurately level with the hand in a vertical position, and registering with the center marking as shown in Fig. 1. The lower portion of the casing is enlarged to permit free movement of the weight either backward into the rear portion of the casing as shown in dotted lines in Fig. 2, or forward into the front of the casing 3.

Figure 2:
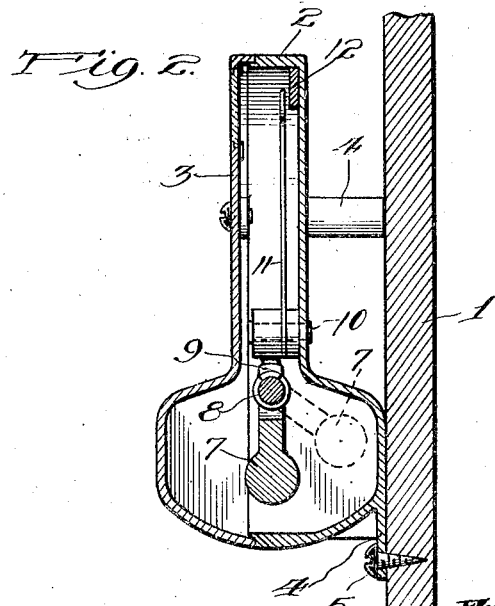
Fig. 2 is a side sectional view of the construction shown in Fig. 1.

When the vehicle is climbing a steep grade or hill of any sort the weight will maintain a vertical position due to the gravitational forces, and will move backward relative the direction of travel of the vehicle to a position such as that shown in the dotted lines in Fig. 2, or to any position between the dotted lines position and the vertical position according to the steepness of the grade. This backward movement of the weight 7 is transmitted to the worm due to the weight connection by the yoke 7ª to the pivoted worm 8. Rotation of the worm in turn moves the pivoted sector and hand 11 on their pivot 10 indicating the percent of gradient on the graduated arc 12. When the vehicle is climbing or going upgrade, the hand will indicate the steepness of the grade upon that portion of the sector to the left of the vertical position of the hand shown in Fig. 1 while going down grade or descending a hill, the steepness will be indicated on that portion of the arc to the right of the central position of the hand 11.

This device is particularly adapted to use in mountainous or hilly country to inform the driver of the steepness of the grade either climbing or descending, and assist him in manipulation of the control levers such as the brake or accelerator mechanism, aiding more careful operation of the vehicle.

In night driving, by keeping careful note of the grade meter and the speedometer, the driver may be greatly assisted in the careful operation of his machine.

In going down grade, it is obvious that the weight will swing forwardly into the front portion of the casing, and move the hand in the opposite direction from its upgrade movement.

A liquid level may be maintained, if desired, in the lower casing to prevent sudden strain upon the device, and particularly upon the tapered bearing, due to jolting, also facilitating the smooth slow accurate movement of the weight.

The front casing of the device is preferably solid exposing only the upper portion of the hand, and graduated arc, which are the essential indicating registering elements of the device.

I claim as my invention:

In a grade indicating device for vehicles in combination with the dash board, a casing mounted on said dash board of the vehicle, a shaft transverse of the vehicle body in said casing, a worm gear on said shaft, a pendulum weight carried by said shaft and adapted to rotate the shaft and worm gear, a second shaft in said casing at right angles to said first shaft, a gear sector on said second shaft meshing with the worm gear, a scale, a pointer rigidly connected to the gear sector adapted to co-operate with said scale to indicate the inclination of the vehicle, and a liquid in the lower part of the casing surrounding the pendulum weight.

FRED C. JACKSON.